United States Patent [19]

Ohnishi et al.

[11] Patent Number: 4,893,236

[45] Date of Patent: Jan. 9, 1990

[54] ELECTRONIC CASH REGISTER

[75] Inventors: Souichi Ohnishi, Yao; Yasuhide Nakamura; Kensaku Komai, both of Yamatokoriyama; Kazuyuki Goto, Osaka, all of Japan

[73] Assignee: Sharp Kabushiki Kaisha, Osaka, Japan

[21] Appl. No.: 80,568

[22] Filed: Jul. 31, 1987

[30] Foreign Application Priority Data

Jul. 31, 1986 [JP] Japan .............................. 61-181705

[51] Int. Cl.$^4$ .............................................. G07G 1/12
[52] U.S. Cl. ................................................... 364/405
[58] Field of Search ................ 364/405, 900 MS File, 364/404

[56] References Cited

U.S. PATENT DOCUMENTS

| | | | | |
|---|---|---|---|---|
| 4,328,544 | 5/1982 | Baldwin | ............................. | 364/405 |
| 4,360,872 | 11/1982 | Suzuki | ............................... | 364/405 |
| 4,419,738 | 12/1983 | Takahashi | ....................... | 364/405 X |
| 4,564,904 | 1/1986 | Kumagi | ............................... | 364/405 |
| 4,649,481 | 5/1987 | Takahashi | .......................... | 364/405 |
| 4,729,097 | 3/1988 | Takaoka | .............................. | 364/405 |

FOREIGN PATENT DOCUMENTS 0058803 12/1981 European Pat. Off. .
0072219 8/1982 European Pat. Off. .
0114261 11/1983 European Pat. Off. .
0157342 3/1985 European Pat. Off. .

OTHER PUBLICATIONS

Bharucha, K., "dBase III, Plus-A Comprehensive User's Manual", 1986, pp. 9, 10, 25-37.

Primary Examiner—Jerry Smith
Assistant Examiner—Steven G. Kibby
Attorney, Agent, or Firm—Birch, Stewart, Kolasch & Birch

[57] ABSTRACT

An electronic cash register comprising a key input device having a plurality of operation keys, a file structured memory unit whose memory region is divided into a plurality of file storage regions for storing a plurality of different types of accumulated data, and a control unit for controlling the key input device and the memory unit. The control unit controls the memory unit so as to change the space allocation of a desired file storage region, generate a required file storage region, or erase a predetermined storage region.

8 Claims, 8 Drawing Sheets

ELECTRONIC CASH REGISTER

BACKGROUND OF THE INVENTION

The present invention relates to an electronic cash register useful for cash transfer accompanying the sale of commodities, say, at a store.

Conventionally, electronic cash registers contain a random-access-memory (RAM) for storing accumulated sales data. However, no electronic cash registers have been provided that make an effective use of the built-in RAM.

SUMMARY OF THE INVENTION

An object of the present invention is to provide an electronic cash register capable of altering the memory capacity of each storage region allocated in the RAM for storing each of different accumulated data as well as of erasing a particular storage region or generating a required storage region in the RAM.

Briefly described, in accordance with the present invention, an electronic cash register comprises key input means having a plurality of operation keys, memory means comprising a plurality of storage regions for storing a plurality of accumulated data of different kinds, and means for controlling the key input means and the memory means. The control means controls the memory means so as to increase or decrease the memory capacity of any particular storage region, erase any desired storage region, or generate a required storage region in the memory means i.e.. changing the amount of storage space allocated to a certain type of data within a file structured random access memory.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 2 is a plan view of the key input means shown in FIG. 1;

FIG. 9 shows an example of record data stored in a file;

FIG. 10 is another example of record data in a file;

DESCRIPTION OF THE PREFERRED EMBODIMENT

Figure 1:
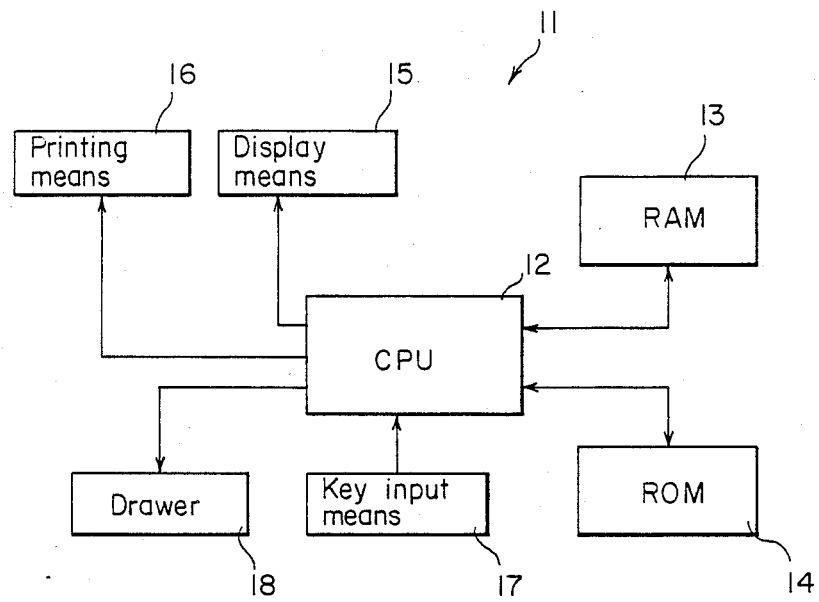
FIG. 1 is an electric circuit block diagram of an embodiment of an electronic cash register according to the present invention.
Figure 2:
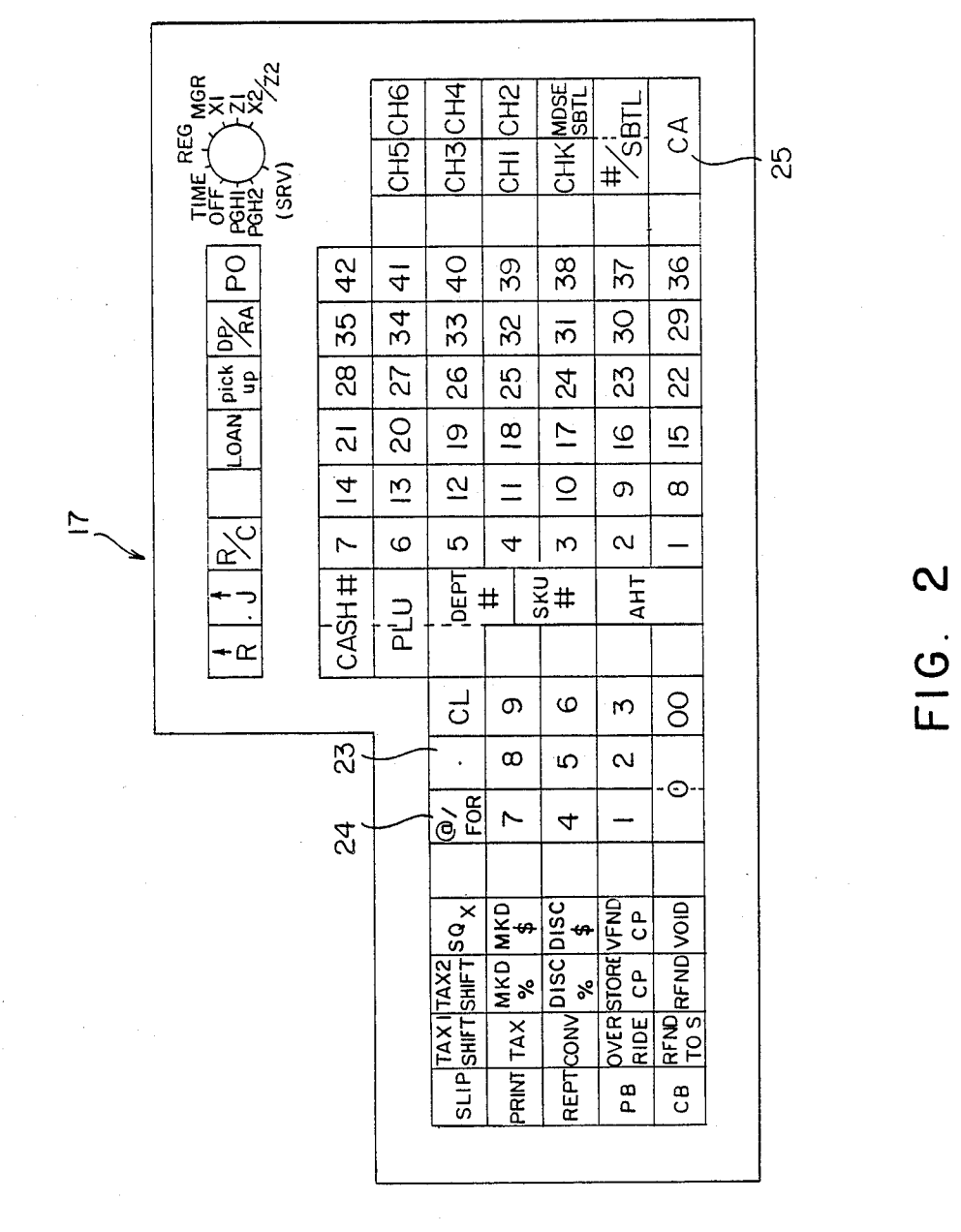

FIG. 1 is an electric circuit block diagram of an embodiment of an electronic cash register (hereinafter abbreviated as ECR) 11 of the present invention. The ECR 11 comprises a central processing unit (CPU) 12 which functions as the control means, a random-access-memory (RAM) 13 which functions as the memory means, a read-only-memory (ROM) 14, display means 15, printing means 16, key input means 17 having a plurality of operation keys, and a drawer 18 for storing cash. FIG. 2 is a plan view of the key input means 17. As shown, a plurality of operation keys are arranged on the key input means 17.

The ROM 14 stores control procedures (programs) with the CPU 12 executing at least one control operation when instructed by a signal input given by key operation from the key input means 17. The control result is stored in the RAM 13, and if required by the operator, presented on the display means 15 and printed out by the printing means 16.

Figure 3:
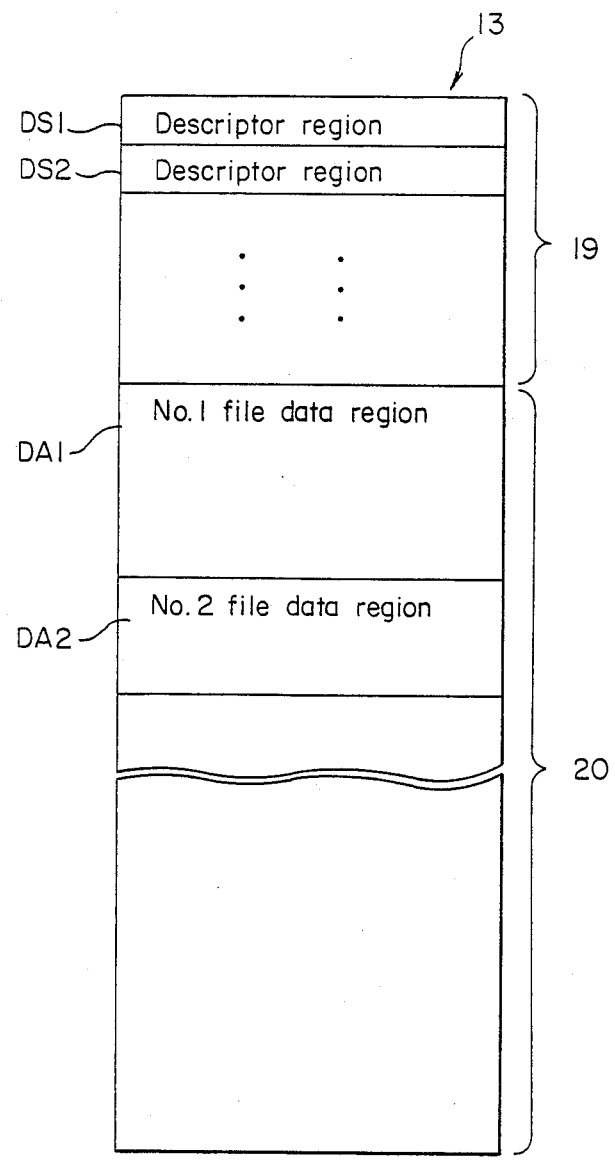
- FIG. 3 shows the structure of the storage regions in the RAM shown in FIG. 1.

FIG. 3 shows the structure of the storage regions in the RAM 13. The RAM 13 comprises a file structure device including file descriptor regions 19 and file data regions 20. The file descriptor regions 19 have a fixed memory capacity and store start address, end address and data structure of the file data regions (described later) 20 for each file (Here, a file refers to each storage region allocated in the RAM 13). Write/read for each file is controlled through the file descriptor regions. Specifically, write/read for the No. 1 file data region DA1 is controlled through the descriptor region DS1, and that for subsequent file data regions through the corresponding descriptor regions DS2, DS3, . . .

The file data regions 20 store various accumulated data by file. The memory capacity of each file data region for a file is variable; when there is no file, the capacity of the file data region is zero.

Figure 4:
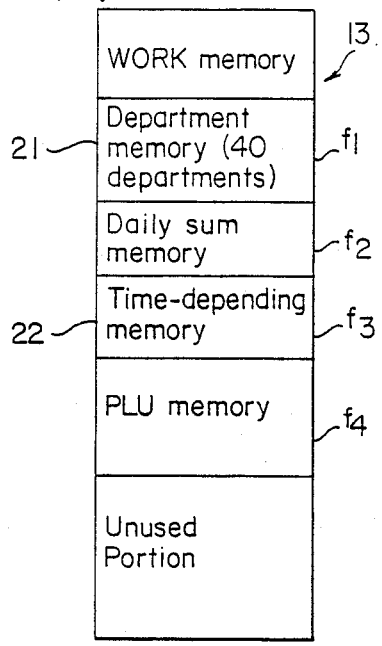
FIGS. 4(1)–4(4) show the file allocation in the RAM shown in FIG. 1.
Figure 4:
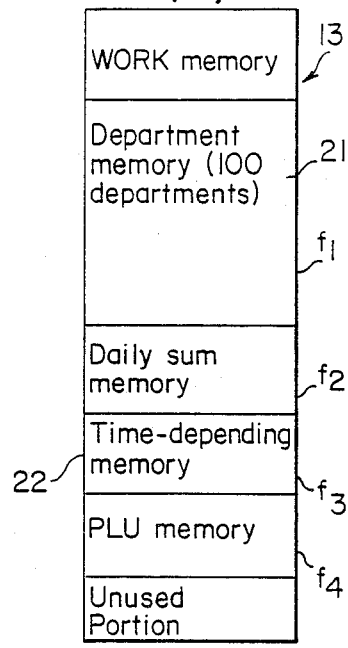
Figure 4:
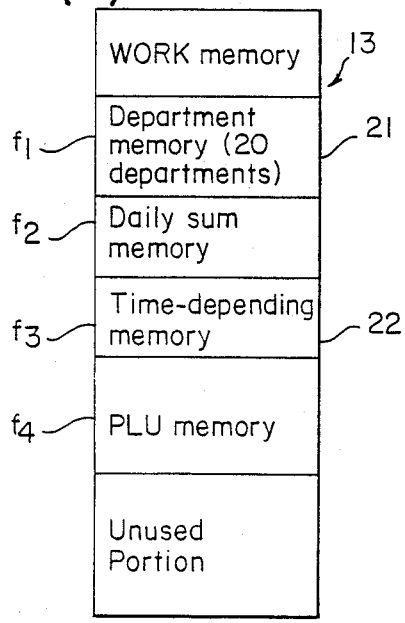
Figure 4:
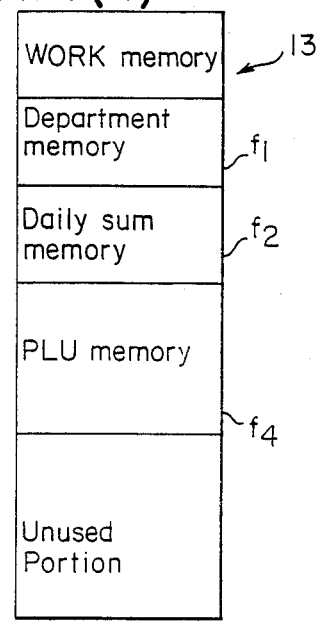

Operation of the ECR 11 of the above construction is described below:

Assume first of all that the ECR 11 with the RAM 13 has file allocation as shown in FIG. 4(1) and is used in a store. Each file $f_1$, $f_2$, ... $f_n$ is allotted with file number. A department memory region 21 which is one of the files is set in advance to have a memory capacity or space allocation for storing up to 40 departments. The number of departments may increase or decrease as the store is expanded or reduced in scale. The memory capacity i.e. the space allocated for this type of data the department memory region 21 may be increased or decreased to be accommodated to the change in the number of departments. A specified unit or amount of data storage such as the memory capacity for one department is called a record.

Figure 5:
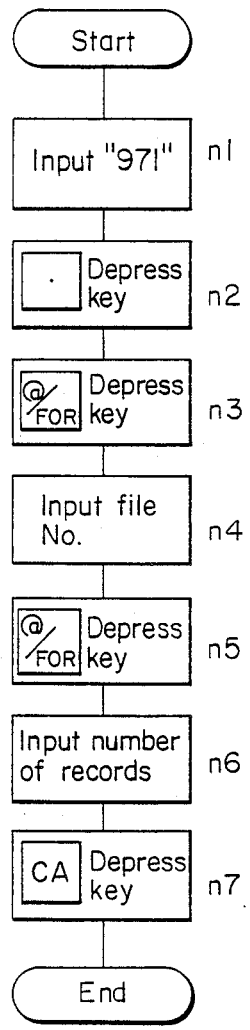
FIG. 5 is a flow chart for explaining the procedure of setting the number of records in a particular file.

The operation procedure for changing the number of departments is now described with reference to FIG. 5 which shows the flow chart of the operation for setting the number of records in a particular file. The operator inputs "971" for designating the program for this operation (Step n1), depresses "." key 23 ((FIG. 1) on the key input means 17 (Step n2) and "@/FOR" key 24 (Step n3), inputs the file No. of the department memory region (Step n4), depresses "@/FOR" key 24 again (Step n5), and inputs the desired number of records i.e. departments (Step n6). Finally, the operator depresses "CA" key 25 to end the procedure. A desired memory capacity is thus set for the file.

FIGS. 4(2) and 4(3) show or space allocation file allocation in the RAM 13 where the memory capacity of the department memory region 21 is increased from 40 departments to 100 departments and where the memory capacity of the department memory 21 is decreased to 20 departments, respectively.

Figure 6:
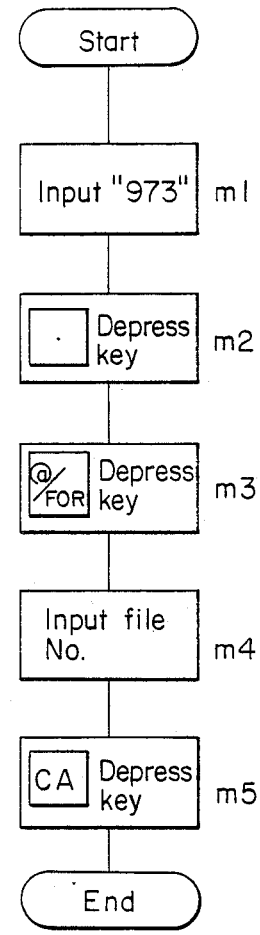
FIG. 6 is a flow chart for explaining the procedure of erasing an unnecessary file.

A description will now be for the operation for erasing a time-depending memory region 22, file $f_3$, another file in the RAM 13 shown in FIG. 4(1), with reference to the flow chart of FIG. 6. The operator inputs "973" for designating the program for this operation (Step m1), depresses "." key 23 on the key input means 17 (Step m2) and "@/FOR" key 24 (Step m3), inputs file No. of the time-depending memory region 22 (Step m4), and depresses "CA" key 25 to end the procedure (Step m5). The file of the time-depending memory region 22 can be erased in this way. FIG. 4(4) shows the no file allocation in the RAM 13 where the time-depending memory region 22 has been erased.

Figure 7:
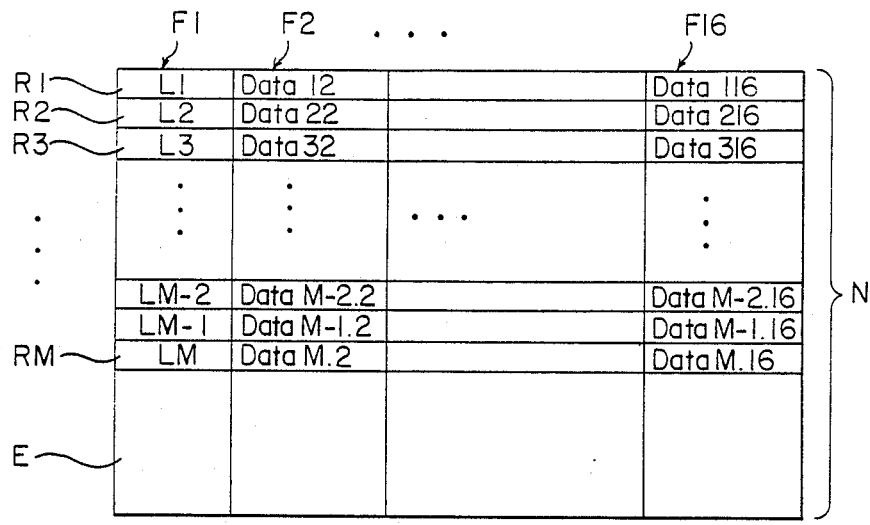
FIG. 7 shows the structure of a file not divided into blocks.
Figure 8:
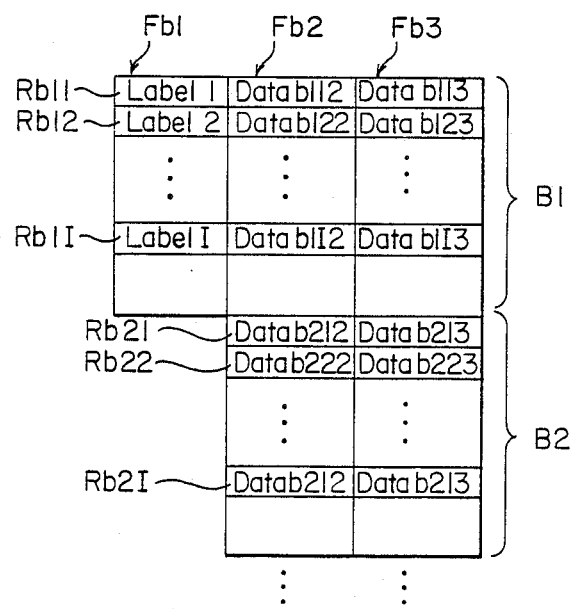
FIG. 8 shows the structure of a file divided into a plurality of blocks.

If data of the records in a file have independent meanings, the records need not be divided into blocks. In other cases, the records may be grouped into several blocks for convenience. FIG. 7 shows the structure of a file in which the records are not grouped, and FIG. 8 shows the structure of a file where the records are grouped into a plurality of blocks. FIGS. 9 and 10 show two specific examples of record data arrangement in a file.

In FIG. 7, M records are stored in a file capable of storing up to N records. Each of the records R1, R2, . . ., RM comprises sixteen fields. The first field F1 stores label data L1, L2, . . . , LM. The memory capacity for each record is 256 bytes. Here, M and N have the relationship expressed as:

$$0 \leq M \leq N \leq 65535 \ldots \quad (1).$$

As shown in FIG. 7, the records are stored successively in a file with no open space between adjacent records. The area indicated by E in FIG. 7 is empty with no data stored. FIG. 9 shows the data arrangement in the record R1, one of the records in FIG. 7. The data "1A" in the first field F1 represents the department name "department of fruit". The data "0000098400" in the second field F2 represents the sale proceeds of ¥9840. "00001230" in the third field F3 indicates that the number of commodities sold is 123. The data "4F52414E47452020" in the sixth field F6 is the ASCII code indicating that the data is related to "oranges".

FIG. 8 shows the structure of a file for accumulated sales data for each salesman. The memory capacity of the 4th to the 16th fields of each record is set to zero. This file is divided into a plurality of blocks, each containing data for a different salesman. Each block is capable of storing up to H records. In FIG. 8, I records are stored in each block. The file structure of the first block B1 is identical with that shown in FIG. 7. The second block B2 and the subsequent blocks do not contain the first field; the first field in the first block B1 is shared by all the other blocks. For instance, the first record Rb21 in the second block B2 uses the label data "Label 1" of the first record Rb11 in the first block B1.

FIG. 10 shows the data arrangement in the record Rb11 shown in FIG. 8. "434131" in the first field Fb1 is the ASCII code representing a record data name. "0001234000" in the second field Fb2 represents the sale proceeds of ¥123400. The data "007890" in the third field Fb3 indicates that the number of transactions is 789. The type of the data thus stored in each record of a file is limited to two kinds: so-called packed decimal data and binary data. The packed decimal data is a numeric data having a number of two figures in a byte plus a sign. The sign is set in the lower four bits in the last byte; the lower four bits are set to "0000" for a positive number, "1101" for a negative number, "1010" for a positive overflow data, and "1011" for a negative overflow data. The data in the second field F2 and in the third field F3 shown in FIG. 9 are packed decimal data.

The binary data is a byte of data expressed in the hexadecimal notation "00"(H) to "FF"(H) or by binary numbers "00000000" to "11111111" in the binary notation. The data in the first field F1 and in the sixth field F6 of FIG. 9 are binary data.

Figure 11:
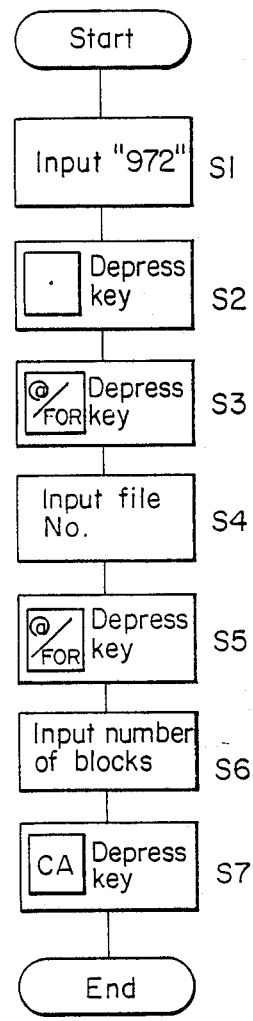
FIG. 11 is a flow chart for explaining the procedure of changing the number of blocks in a file.

According to the present invention, as described earlier, the ECR 11 is capable of changing the number of blocks in a particular field. FIG. 11 is a flow chart showing the procedure of changing the number of blocks. Referring to the flow chart, the operator inputs "972" for designating the program for this operation (Step S1), depresses "." key 23 (Step S2) and then "@/FOR" key 24 (Step S3), inputs file No. of the file whose number of blocks is to be changed (Step S4), depresses "@/FOR" key 24 again (Step S5), inputs desired number of blocks (Step S6), and depresses "CA" key 25 to end the procedure (Step S7).

Figure 12:
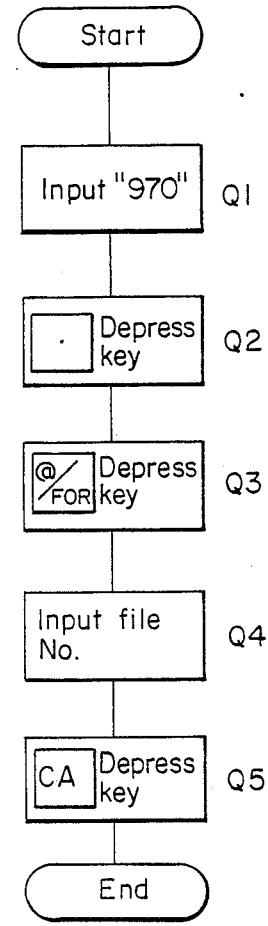
FIG. 12 is a flow chart for explaining the procedure of generating a new file in the RAM shown in FIG. 1.

FIG. 12 is a flow chart showing the procedure of generating a new file in the RAM 13. The new file is stored in advance in separate storage means (not shown). To generate a new file, therefore, it is necessary to connect the separate storage means to the ECR 11. Referring to FIG. 12, the operator inputs "970" to designate the program for the new file generation (Step Q1), depresses "." key 23 (Step Q2) and then "@/FOR" key 24 (Step Q3), inputs file No. of the file to be generated (Step Q4), and depresses "CA" key 24 to end the procedure (Step Q5). A desired file can be thus generated in the RAM 13.

The operation of generating/erasing a file and that of changing the number of records or blocks as mentioned above are executed under control of the CPU 12. It is understood that the ECR 11 of the present invention is capable of varying the allocated memory capacity of a particular storage region as desired, erasing any particular storage portion, and generating a new storage region in the RAM 13.

According to the present invention, as appreciated from the above, the control means controls the memory means so as to change the memory allocation of space of any particular storage region, erase an unnecessary storage portion, or generate a new storage region in the memory means. Accordingly, it is possible to select only necessary data for storage from various accumulated data and to vary the memory space allocation depending on the amount of data to be stored. The present invention therefore allows the memory means to be used as efficiently as possible, thus remarkably enhancing the usefulness of the electronic cash register.

According to the present invention, the memory capacities of the storage regions allocated in the memory means for storing various accumulated data are varied, any particular storage regions are erased, and new storage regions are generated in the memory means, under control of the control means by a simple key operation of the key input means, so that the operation for example, increasing the memory space allocation for a particular type of accumulated data becomes relatively easy. It should be understood, therefore, that the present invention permits the most effective use of a RAM in an electronic cash register.

While certain embodiments of the present invention have been described, it will be apparent to those skilled in the art that various changes and modifications may be made therein without departing from the spirit and scope of the present invention as hereinafter claimed.

What is claimed is:

1. An electronic cash register, comprising:
   key input means having a plurality of operation keys;
   file structured memory means divided into a plurality of file storage regions for storing a plurality of different types of accumulated data;
   control means for controlling said key input means and said memory means; and
   wherein said control means controls said memory means so as to change the space allocation of a predetermined file storage region, generate a space allocation for a required file storage region or erase the space allocation for a selected file storage region in the memory means.

2. The electronic cash register of claim 1, wherein there is no space between immediately adjacent file storage regions.

3. The electronic cash register of claim 1, wherein each of said file storage regions include a file descriptor region and a file data region.

4. The electronic cash register of claim 3, wherein said file descriptor region stores start address, end address and data structure of said file data region for a respective said file storage region.

5. The electronic cash register of claim 4 wherein said file descriptor region has a fixed space allocation.

6. The electronic cash register of claim 5 and wherein said file data region has a variable space allocation.

7. An electronic cash register, comprising:
   key input means having a plurality of operation keys;
   file structured memory means divided into a plurality of file storage regions for storing a plurality of different types of accumulated data;
   control means for controlling said key input means and said memory means;
   wherein said control means controls said memory means so as to change the space allocation of a predetermined file storage region, generate a space allocation for a required file storage region or erase the space allocation for a selected file storage region in the memory means;
   each of said file storage regions further including a file descriptor region and a file data region; and
   wherein said file descriptor region for each file storage region stores start address, end address and data structure of said file data region for the respective file storage region.

8. The electronic cash register of claim 7 wherein said file descriptor region has a fixed space allocation and said file data region has a variable space allocation.

* * * * *